United States Patent
Kawamura

(10) Patent No.: US 9,898,185 B2
(45) Date of Patent: Feb. 20, 2018

(54) CONTROL METHOD, ELECTRONIC DEVICE AND STORAGE MEDIUM

(71) Applicant: FUJITSU LIMITED, Kawasaki-shi, Kanagawa (JP)

(72) Inventor: Yoshimasa Kawamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/062,065

(22) Filed: Mar. 5, 2016

(65) Prior Publication Data
US 2016/0291794 A1    Oct. 6, 2016

(30) Foreign Application Priority Data
Apr. 2, 2015 (JP) .................. 2015-075874

(51) Int. Cl.
G06F 3/041    (2006.01)
G06F 3/0488   (2013.01)
G06F 3/0485   (2013.01)

(52) U.S. Cl.
CPC .......... *G06F 3/0488* (2013.01); *G06F 3/0418* (2013.01); *G06F 3/0485* (2013.01)

(58) Field of Classification Search
USPC .................................. 345/173–178
See application file for complete search history.

(56) References Cited

U.S. PATENT DOCUMENTS 8,577,644 B1    11/2013 Ksondzyk et al.
2006/0284858 A1*  12/2006 Rekimoto ............... G06F 3/033
                                                    345/173
2011/0001694 A1*   1/2011 Homma ................. G06F 3/0485
                                                    345/156
2013/0111397 A1*   5/2013 Miyoshi ................ G06F 3/0485
                                                    715/784
2013/0181929 A1*   7/2013 Nagasaka ............. G06F 3/0485
                                                    345/173
2015/0002479 A1    1/2015 Kawamura
(Continued)

FOREIGN PATENT DOCUMENTS

EP    2690538 A1      1/2014
JP    2011-210283    10/2011
JP    2013-020332     1/2013
(Continued)

OTHER PUBLICATIONS

Extended European Search Report corresponding to European Application No. 16157512.1 dated Nov. 7, 2016.
(Continued)

*Primary Examiner* — Roy Rabindranath
(74) *Attorney, Agent, or Firm* — Maschoff Brennan

(57) ABSTRACT

A control method that is executed by a processor included in an electronic device including a touch panel provided in association with a display device, the control method includes detecting magnitude of a contact area when the touch panel is touched; setting a threshold used for determining whether a touch position on the touch panel has changed, based on the magnitude of the contact area; determining that a scroll instruction to the display device has been made when a change in touch position is larger than the threshold; and executing move control of an image displayed on a screen of the display device in accordance with the scroll instruction.

16 Claims, 15 Drawing Sheets

(56) References Cited

U.S. PATENT DOCUMENTS

2015/0193037 A1\* 7/2015 Masaki ............... G06F 3/03545
　　　　　　　　　　　　　　　　　　　　345/173

FOREIGN PATENT DOCUMENTS

| JP | 2014-21556 | 2/2014 |
| JP | 2014-41391 | 3/2014 |
| JP | 2015-011401 | 1/2015 |

OTHER PUBLICATIONS

"Managing Touch Events in a ViewGroup", online, Android Developers, Searched on Mar. 9, 2015 Internet <URL: http://developer.android.com/training/gestures/viewgroup.html>.

\* cited by examiner

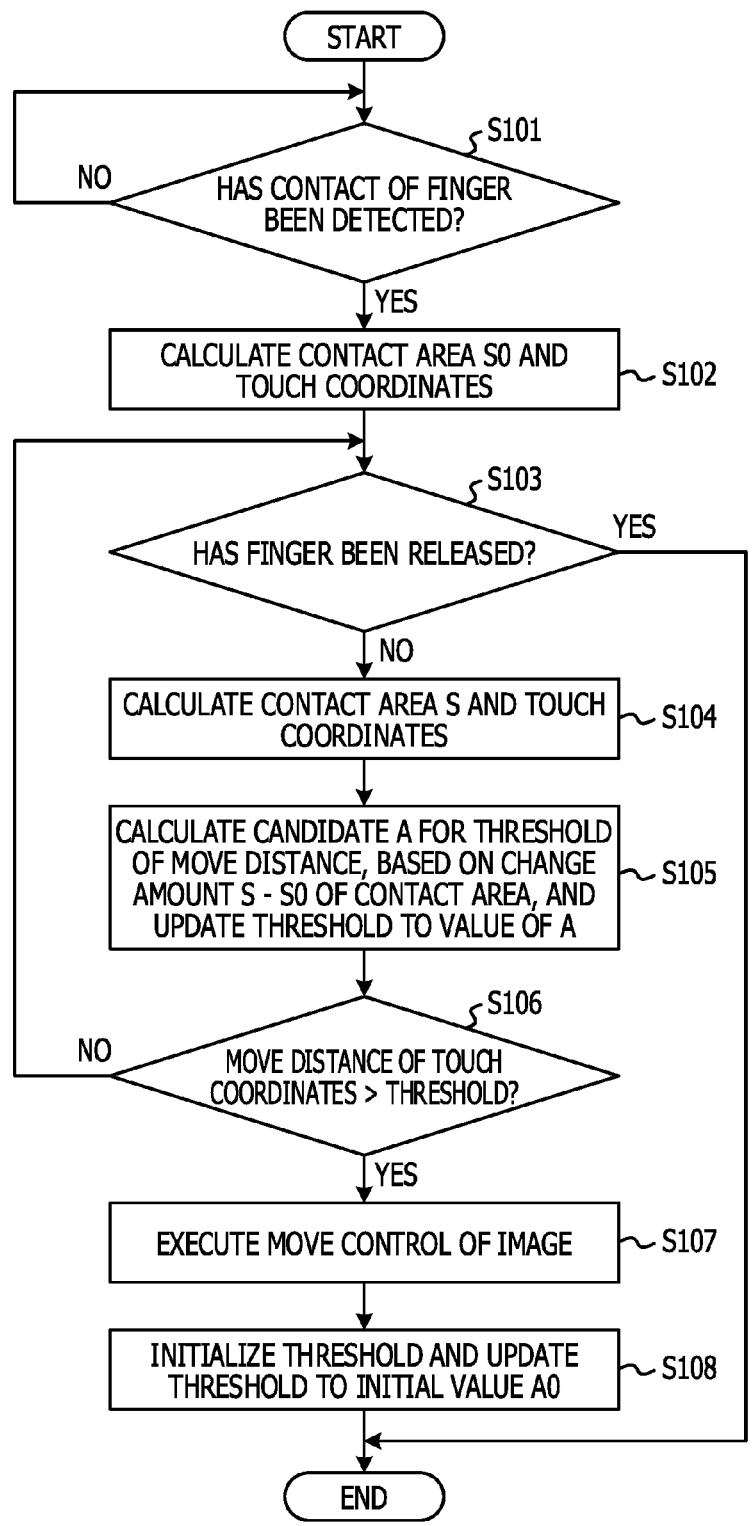

TOUCH POSITION

P1 ⇨ P2 ⇨ P3 ⇨ P4 ⇨ P5

TIME

CENTER    FINGER CONTACT PART

THRESHOLD OF MOVE DISTANCE

LARGEST VALUE IS MAINTAINED

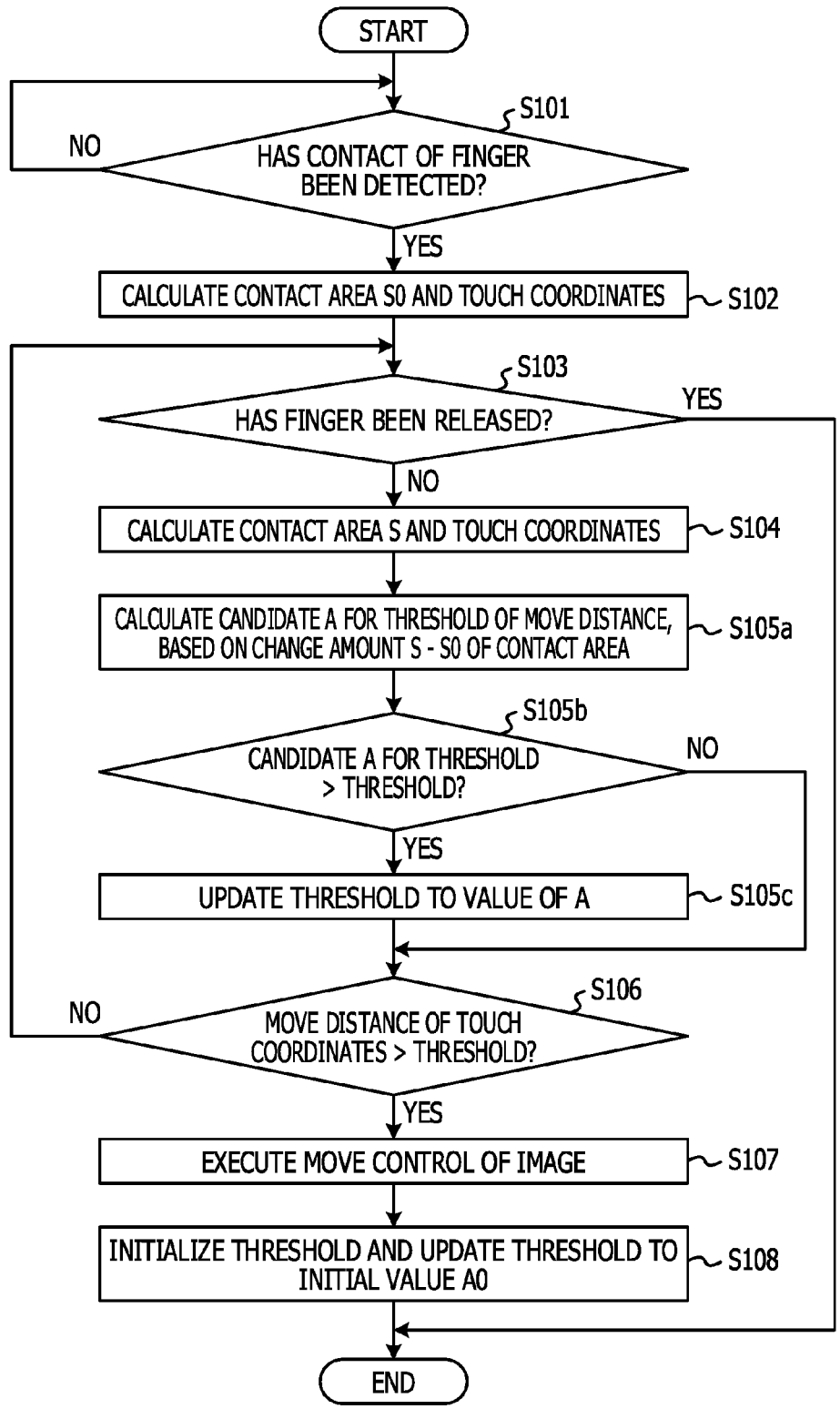

CONTROL METHOD, ELECTRONIC DEVICE AND STORAGE MEDIUM

CROSS-REFERENCE TO RELATED APPLICATION

This application is based upon and claims the benefit of priority of the prior Japanese Patent Application No. 2015-075874, filed on Apr. 2, 2015, the entire contents of which are incorporated herein by reference.

FIELD

The embodiments discussed herein are related to a control method, an electronic device, and a storage medium.

BACKGROUND

In recent years, in electronic devices, such as smartphones, personal computers, and the like, an operation performed using a touch panel has become the mainstream. A touch panel is operated with a finger or a touch pen, and thus, an icon displayed on a screen may be selected, for example, by tapping a screen (an operation screen) with a finger, and a so-called scroll that causes an image, such as a text, a picture, and the like, which is displayed on the screen, to slide in a predetermined direction on the screen may be performed. An operation of tapping a screen is also called tap.

In Android OS®, which is a platform employed in many smartphones, for example, as described in "Managing Touch Events in a ViewGroup", [online], Android Developers, [Searched on Mar. 9, 2015], Internet <URL: http://developer.android.com/training/gestures/viewgroup.html>, a threshold called "touch slop" is used to control a move of an image displayed on a screen. In accordance with this control method, first, coordinate information of a position touched (contacted) by a finger or a touch pen is acquired by a touch sensor provided in a touch panel. Then, if a change amount of the coordinate information, that is, a move amount of a contact position, exceeds the value of a touch slope, it is determined that a touch position has changed, and a scroll of the screen is performed.

For example, Japanese Laid-open Patent Publication No. 2013-020332, Japanese Laid-open Patent Publication No. 2015-011401, and "Managing Touch Events in a ViewGroup", [online], Android Developers, [Searched on Mar. 9, 2015], Internet <URL: http://developer.android.com/training/gestures/viewgroup.html> discuss related art.

There are cases where a user is not able to perform a screen operation via a touch panel as intended by the user. For example, there are cases where, when the user presses a screen with a finger to select an icon on the screen, the screen is scrolled and the user is not able to correctly select the icon. Therefore, for electronic devices which include a touch panel, it is desired to increase the convenience of a screen operation.

SUMMARY

According to an aspect of the invention, a control method that is executed by a processor included in an electronic device including a touch panel provided in association with a display device, the control method includes detecting magnitude of a contact area when the touch panel is touched; setting a threshold used for determining whether a touch position on the touch panel has changed, based on the magnitude of the contact area; determining that a scroll instruction to the display device has been made when a change in touch position is larger than the threshold; and executing move control of an image displayed on a screen of the display device in accordance with the scroll instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a flow chart illustrating an example of a control method performed by the electronic device according to the first embodiment;

FIG. 9 is a flow chart illustrating an example of a control method performed by an electronic device according to the second embodiment;

DESCRIPTION OF EMBODIMENTS

Embodiments of the present disclosure will be specifically described below with reference to FIG. 1 to FIG. 15.

Embodiments of an electronic device according to the present disclosure are applied to smartphones, personal computers, and the like. However, application of the present disclosure is not limited thereto, but the present disclosure may be applied to generally all electronic devices which include a touch panel. Although examples in which an operation of a screen is performed using a finger will be described below, an operation of a screen is not limited to an operation performed using a finger. For example, an operation of a screen may be performed using an operation tool, such as a touch pen and the like, which includes, in an end portion thereof, an elastic material of which a contact area is changed by pressing the screen.

The present inventor found that, when a user who is not used to using a touch panel selects an icon on a screen using a touch panel, the user is likely to perform operations of (1) touching a target icon that is to be selected, (2) further pressing the icon after touching it, and (3) taking off (releasing) the finger in series. The inventor further found that, when a user who is not used to using a touch panel scrolls a screen using a touch panel, the user is likely to perform operations of (1) touching a screen with a finger tip, (2) moving the finger in a direction in which the user desires to move the screen, and (3) taking off (releasing) the finger in series.

In general, when a user presses a button, the user first touches the button and then performs a pressing operation. Therefore, it is presumed that, when the user performs the former operations described above, the user performs similar movements to those when the user presses the button. In general, when a person moves a sheet of paper placed on a desk using a finger, the person moves the finger without pressing the sheet of paper with the finger to move the sheet of paper. Therefore, it is presumed that, when a user performs the latter operations described above, the user performs similar movements to those when a person moves a sheet of paper placed on a desk. Control of a scroll of a screen, which is executed by an electronic device when a touch panel is operated, will be described below. The control of a scroll will be hereinafter referred to as a "move control".

Figure 1A:
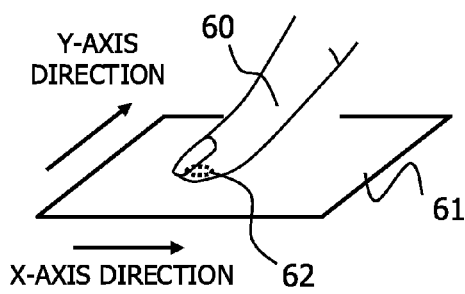
FIGS. 1A, 1B, 1C, 1D, 1E, and 1F are views and charts illustrating an example of move control of an image performed by an electronic device when a tap operation is performed.

FIGS. 1A, 1B, 1C, 1D, 1E, and 1F are views and charts illustrating an example of move control of an image performed by an electronic device when a tap operation is performed. FIG. 1A is a view illustrating a state in which a screen of a touch panel is tapped by a finger. FIG. 1A illustrates an initial stage in which a finger 60 contacts (touches) a screen 61. In FIG. 1A, a part formed by the dotted line indicated in the finger 60 indicates a contact part 62 of the finger 60 on the screen 61. The contact part 62 has, for example, an ellipsoidal shape.

Figure 1B:
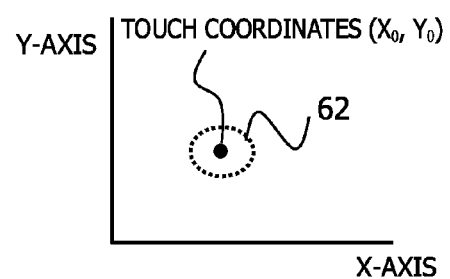

FIG. 1B is a chart illustrating the relationship between a contact part and touch coordinates in the state illustrated in FIG. 1A. The "X-axis" indicates the X-axis on the screen 61, and the "Y-axis" indicates the Y-axis on the screen 61. A dot in the contact part 62 indicates touch coordinates. The touch coordinates are coordinates of a contact position of the finger 60 on the screen 61 and, for example, are coordinates of the position of the center of the contact part 62. In the example of FIG. 1B, the touch coordinates are $(X_0, Y_0)$.

Figure 1C:
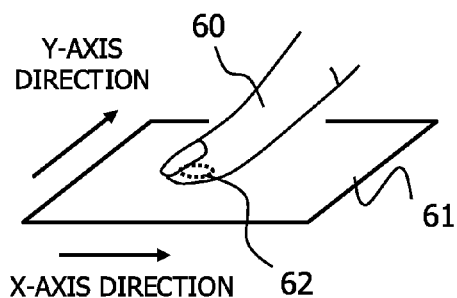

FIG. 1C is a view illustrating a state in which, from the state illustrated in FIG. 1A, the screen is further pressed by the finger. As indicated by the dotted line in FIG. 1C, when the screen 61 is further pressed by the finger 60, the area of the contact part 62 is larger than that in FIG. 1A.

Figure 1D:
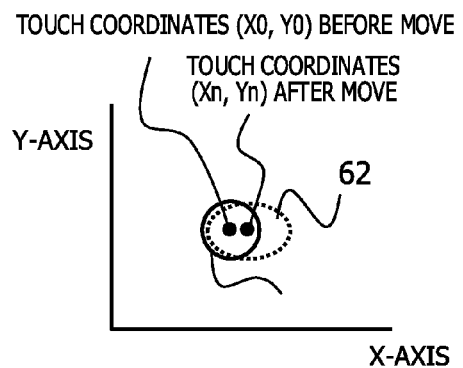

FIG. 1D is a chart illustrating the relationship between the contact part and the touch coordinates in the state illustrated in FIG. 1C. The touch coordinates move in conjunction with the position of the contact part 62 of the finger 60 and, when the contact part 62 moves in accordance with a movement of the finger 60, the values of the touch coordinates change in accordance with the move amount and move direction thereof. A part surrounded by the solid circle indicates a range of a threshold of the move distance of the touch coordinates in which move control of an image is not performed, and the radius of the circle indicates the threshold. That is, even when the touch coordinates move, unless the touch coordinates are out of the part surrounded by the solid circle, it is not determined that a touch position has changed, and move control of the image is not performed. On the other hand, if the touch coordinates move to be out of the part surrounded by the solid circle, it is determined that the touch position has changed, and accordingly, it is determined that a scroll instruction to a display device 50 was made, so that move control of the image is performed. As described above, the threshold is used as the threshold of the move distance of the finger, based on which whether or not move control of an image is to be executed is determined.

From the state illustrated in FIG. 1A, when the screen 61 is further pressed by the finger 60 as illustrated in FIG. 1D, the length of an ellipse that indicates the contact part 62 in the longitudinal direction is larger than that in FIG. 1B. Then, the touch coordinates move in accordance with the change of the contact part 62, and the values of the touch coordinates change from the initial values $(X_0, Y_0)$ to $(X_n, Y_n)$. However, the touch coordinates $(X_n, Y_n)$ after the change are in the range of the threshold, and therefore, move control of the image is not performed.

Figure 1E:
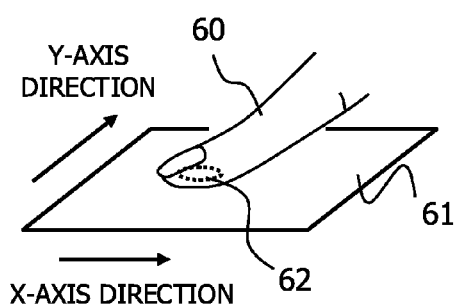

FIG. 1E is a view illustrating a state in which the screen is pressed more strongly than in the state illustrated in FIG. 1C. When the screen 61 is pressed more strongly by the finger 60 than in the state illustrated in FIG. 1C, as indicated by the dotted line in FIG. 1E, the area of the contact part 62 further increases to be larger than that in FIG. 1C.

Figure 1F:
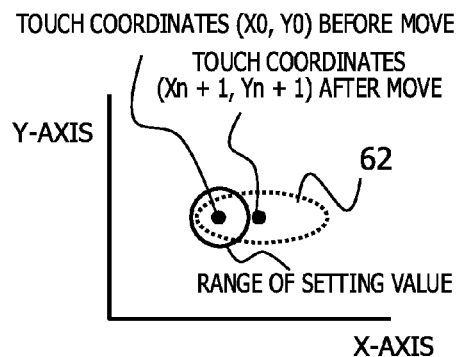

FIG. 1F is a chart illustrating the relationship between the contact part and the touch coordinates in the state illustrated in FIG. 1E. When the screen 61 is pressed by the finger 60 more strongly than in the state illustrated in FIG. 1C, as illustrated in FIG. 1F, the length of the ellipse that indicates the contact part 62 in the longitudinal direction further increases to be longer than that in FIG. 1D. Then, accordingly, the touch coordinates move, and the values of the touch coordinates change from the initial values $(X_0, Y_0)$ to $(X_{n+1}, Y_{n+1})$. Then, the touch coordinates $(X_{n+1}, Y_{n+1})$ after the change are out of the part surrounded by the solid circle. Therefore, in the case of FIG. 1E, move control of the image is performed. There are cases where, if, when the user taps the screen 61 to select an icon, the user presses the screen 61 strongly as illustrated in FIG. 1E, the image moves despite the user's intention, and selection of the icon is not correctly performed.

FIGS. 2A, 2B, 2C, 2D, 2E, and 2F are views and charts illustrating an example of move control of an image performed by an electronic device when a scroll operation is performed.

Figure 2A:
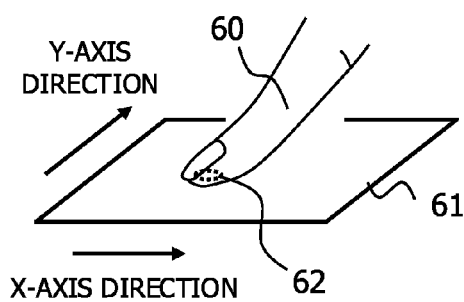
FIGS. 2A, 2B, 2C, 2D, 2E, and 2F are views and charts illustrating an example of move control of an image performed by an electronic device when a scroll operation is performed.
Figure 2B:
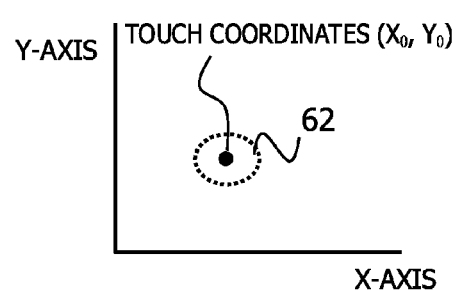

FIG. 2A is a view illustrating a state in which a screen of a touch panel is touched by a finger. FIG. 2A illustrates an initial stage in which the finger 60 contacts the screen 61. FIG. 2B is a chart illustrating the relationship between a contact part and touch coordinates in the state illustrated in FIG. 2A. As indicated by the dotted line in FIG. 2B, when the screen 61 of the touch panel is touched by the finger 60, the contact part 62 has an ellipsoidal shape. In the example of FIG. 2B, the touch coordinates are $(X_0, Y_0)$.

Figure 2C:
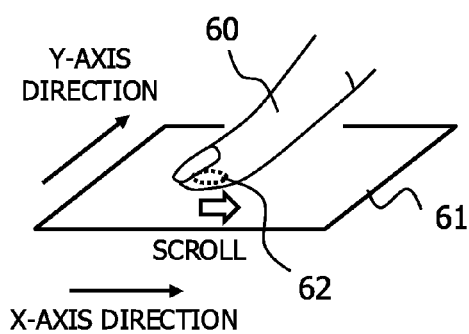
Figure 2D:
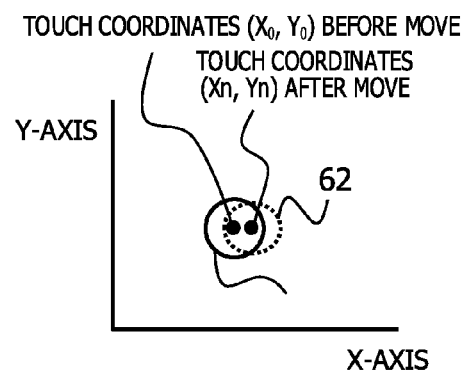

FIG. 2C is a view illustrating a state in which, from the state illustrated in FIG. 2A, a scroll operation is performed by a finger. FIG. 2D is a chart illustrating the relationship between the contact part and the touch coordinates in the state illustrated in FIG. 2C.

When a scroll operation is performed by the finger 60, as illustrated in FIG. 2C, the touch coordinates move, and the values of the coordinates change from $(X_0, Y_0)$ to $(X_n, Y_n)$. However, the touch coordinates $(X_n, Y_n)$ after the change are in the range of the threshold, and therefore, move control of an image is not performed.

Figure 2E:
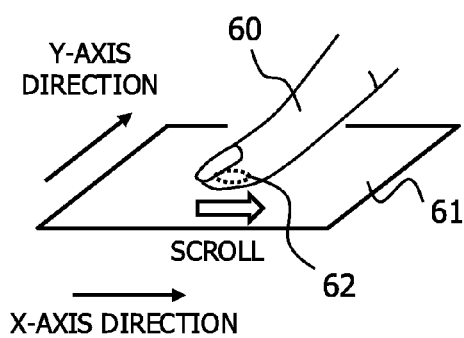
Figure 2F:
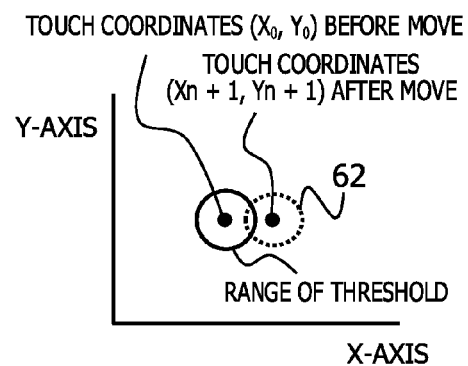

FIG. 2E is a view illustrating a state in which an operation is performed such that the length of a scroll is longer than that in the operation illustrated in FIG. 2C. FIG. 2F is a graph illustrating the relationship between the contact part and the touch coordinates in the state illustrated in FIG. 2E.

When an operation is performed such that the length of a scroll is longer than that in the operation illustrated in FIG. 2C, the move amount (move distance) of the touch coordinates further increases to be larger than that in FIG. 2C, and the touch coordinates $(X_{n+1}, Y_{n+1})$ after the move are out of the range of the threshold. Thus, move control of the image in accordance with the direction of the scroll may be performed.

As described above, in accordance with the above-described control method, an image does not move unless a scroll operation is performed such that the move distance of the touch coordinates exceeds the threshold. Therefore, there are cases where the threshold is set, in advance, to be relatively large so that the image does not move when a tap operation is performed, and thus, when a scroll operation is performed, a timing at which the image starts to move is delayed, depending on the magnitude of the threshold, and the following property of a move of the image relative to a move of the finger is degraded.

First Embodiment

Figure 3:
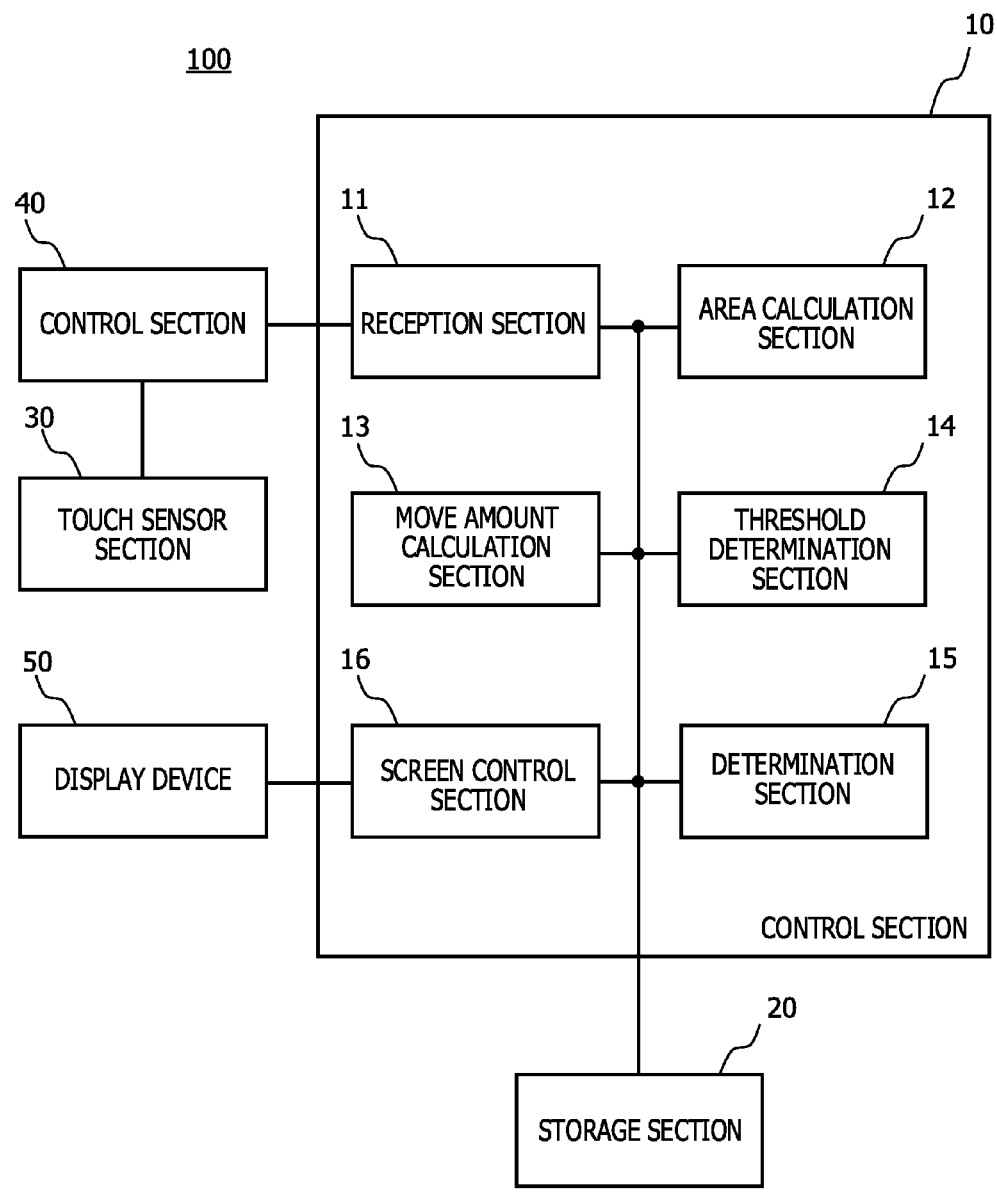
FIG. 3 is a block diagram illustrating an example of a function block of an electronic device according to a first embodiment.

FIG. 3 is a block diagram illustrating an example of a function block of an electronic device according to a first embodiment. As illustrated in FIG. 3, an electronic device 100 includes a control section 10, a storage section 20, a touch sensor section 30, a control section 40, and a display device 50. Respective functions of the above-described components will be described below.

The control section 10 is a hardware that manages processing of the entire electronic device 100. The control section 10 includes a reception section 11, an area calculation section 12, a move amount calculation section 13, a threshold determination section 14, a determination section 15, and a screen control section 16.

The reception section 11 receives information of coordinates of a cell in which a change in electrostatic capacity has occurred from the touch sensor section 30.

The area calculation section 12 calculates a contact area that indicates the size of a contact part when an object, such as a finger and the like, touches a screen, based on information of the number of cells each in which a change in electrostatic capacity has been detected, which has been received by the reception section 11. Then, the area calculation section 12 transmits the information of the contact area, which has been calculated, to the threshold determination section 14. The area calculation section 12 calculates a contact area S0 by counting the number of cells each in which a change in electrostatic capacity has been detected. The move amount calculation section 13 calculates touch coordinates, for example, by calculating the gravity center of each of a plurality of cells corresponding to the contact part, based on coordinates of each of the cells. The area calculation section 12 is an example of a detection section.

The move amount calculation section 13 calculates the touch coordinates, based on information of coordinates of the plurality of cells each in which a change in electrostatic capacity has been detected, which has been received by the reception section 11. The move amount calculation section 13 calculates the move amount of the object, such as a finger and the like, by obtaining a distance between positions indicated by the touch coordinates at different time points.

The threshold determination section 14 determines a threshold used for determining whether or not a touch position has changed, based on the change amount of the touch area in a state in which a contact of the object, such as a finger and the like, is maintained. The threshold determination section 14 first calculates a candidate for the threshold and updates the threshold in accordance with a calculation result, thereby determining the threshold.

The determination section 15 executes various types of determination processing performed in move control of an image by the electronic device 100.

The screen control section 16 controls a move of a screen of the display device 50 by performing a scroll instruction or the like, based on a result of determination processing that is executed by the determination section 15. For example, if it is determined that the move distance of the touch coordinates is larger than the threshold, the screen control section 16 executes move control of the image.

The storage section 20 is a hardware that stores information and a program used for processing that is executed by the control section 10. The storage section 20 may be configured by a plurality of storage devices in accordance with an application or a storage capacity that is to be used.

The touch sensor section 30 detects a contact of an object, such as a finger and the like, to the screen. The touch sensor section 30 may be realized, for example, by a touch panel. The outline of a configuration of the touch sensor section 30 and a method for detecting an object will be described later.

The control section 40 is coupled to the touch sensor section 30, and specifies the coordinates of a position in which a contact detected by the touch sensor section 30 is located. Then, the control section 40 controls processing of transmitting information of the specified coordinates to the control section 10 in association with information of time.

The display device 50 is coupled to the screen control section 16, and may display an image in accordance with control performed by the screen control section 16.

Next, a hardware configuration of the electronic device 100 will be described.

Figure 4:
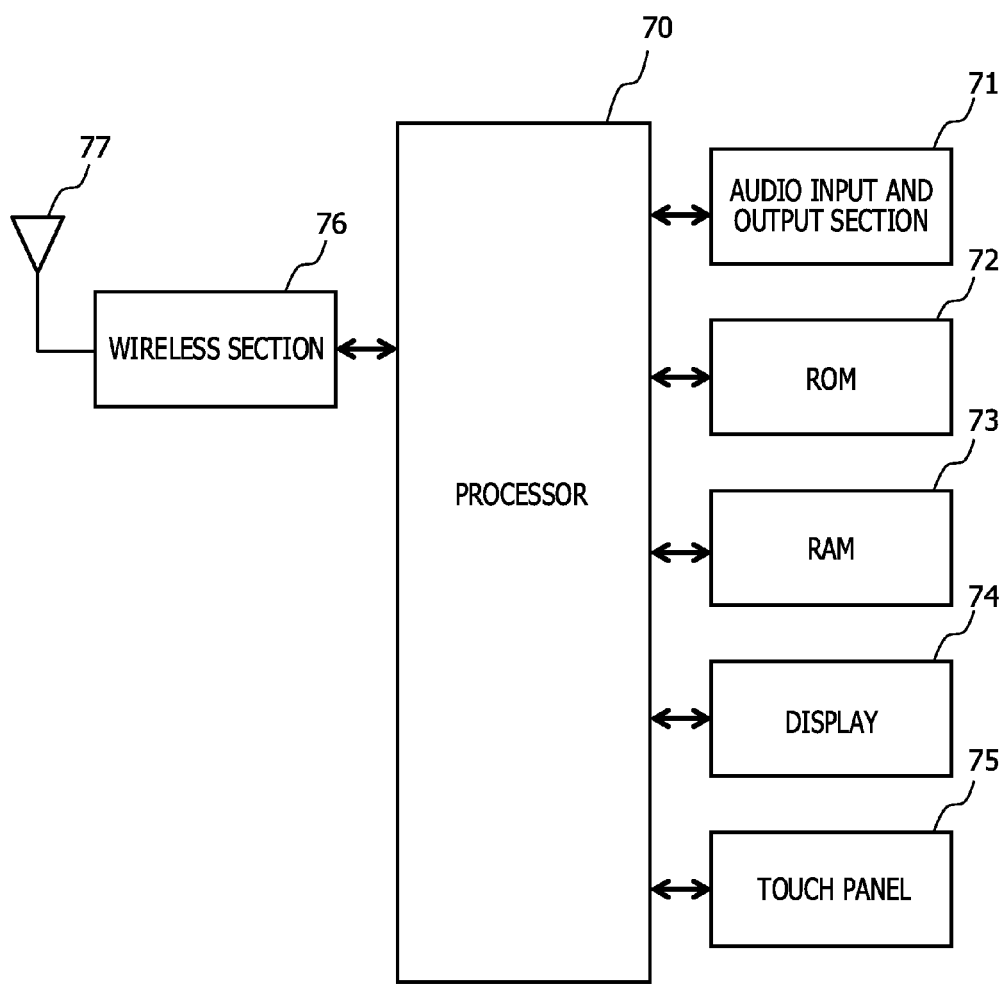
FIG. 4 is a block diagram illustrating an example of a hardware configuration of the electronic device according to the first embodiment.

FIG. 4 is a block diagram illustrating an example of a hardware configuration of the electronic device 100. As illustrated in FIG. 4, the electronic device 100 includes a processor 70, an audio input and output section 71, a read only memory (ROM) 72, a random access memory (RAM) 73, a display 74, a touch panel 75, and the like.

The processor 70 is an arithmetic processing device that executes processing of controlling an operation of the entire electronic device 100. An operation of each of function blocks provided in the control section 10 illustrated in FIG. 3 is realized by the processor 70. The processor 70 may be realized, for example, by a central processing unit (CPU) or a micro processing unit (MPU). The processor 70 is an example of the control section 10 illustrated in FIG. 3.

The audio input and output section 71 includes, for example, an audio input device, such as a microphone and the like, and an audio output device, such as a speaker and the like. For example, when the electronic device 100 is a mobile phone, such as a smartphone and the like, with which a call may be made, the audio input and output section 71 receives an input of an uttered voice of a user and outputs a reception voice.

The ROM 72 and the RAM 73 are examples of the storage section 20 illustrated in FIG. 3. The ROM 72 is a nonvolatile storage device that may store a program (including an information processing program) used for controlling an operation of the electronic device 100. The RAM 73 is a volatile storage device that may be used, in executing a program, as a work area, as appropriate. The RAM 73 may be provided in the processor 70.

The display 74 is an example of the display device 50 illustrated in FIG. 3, and is a device that displays an image. The display 74 may be realized, for example, by a liquid crystal display, a plasma display, an organic EL display, or the like.

The touch panel 75 is an input device that operates the electronic device 100 by a contact of a finger or the like to an operation surface thereof. For example, the touch panel 75 may be disposed on the display 74 so as to overlap the display 74.

The touch panel 75 includes two electrodes that intersect each other perpendicularly, for example, in a position in which a part of the touch panel 75 overlaps with the operation surface. Each of a plurality of parts achieved by dividing the operation surface into pieces in a lattice shape is called cell. Each intersection of the two electrodes corresponds to a single cell. When a finger or the like touches the operation surface, an electrostatic capacity between the electrodes that correspond to a position in which the finger touched the operation surface changes. Thus, one or more cells that correspond to an intersection in which the change in electrostatic capacity occurred are specified, and a touch position may be specified.

The touch sensor section 30 and the control section 40 illustrated in FIG. 3 are parts of the function of the touch panel 75. The control section 40 may be realized by the CPU or the MPU provided in the touch panel 75. The control section 40 may control an operation of the entire touch panel 75.

A wireless section 76 is a hardware that receives a signal via an antenna 77 and outputs a reception signal to the processor 70. The wireless section 76 transmits a signal generated by the processor 70 via the antenna 77. For example, when the electronic device 100 is a mobile phone with which a call may be made, the wireless section 76 transmits and receives a signal of an uttered voice of a user, a reception voice, or the like.

Next, when an operation using a finger is performed, a control method that is executed by the electronic device 100 illustrated in FIG. 3 will be described.

FIG. 5 is a flow chart illustrating an example of a control method performed by the electronic device according to the first embodiment.

First, the determination section 15 determines whether or not the touch sensor section 30 has detected a contact of the finger 60 to the screen 61 (S101). When the finger 60 touches the screen 61, the touch sensor section 30 detects changes in electrostatic capacity in a plurality of cells, among a plurality of cells that forms the screen 61, which corresponds to a part of the screen 61, which is touched by the finger 60. Then, the control section 40 specifies coordinates of the plurality of cells which corresponds to the part of the screen 61, which is touched by the finger 60. Then, the control section 40 transmits coordinate information of the plurality of specified cells to the reception section 11 in the control section 10. The determination section 15 may determine whether or not the touch sensor section 30 has detected a contact of the finger 60 to the screen 61 by receiving coordinate information of a contact position from the control section 40.

In S101, if it is not determined that the touch sensor section 30 has detected a contact of the finger 60 (NO in S101), processing of S101 is executed again. On the other hand, if it is determined that the touch sensor section 30 has detected a contact of the finger 60 (YES in S101), the area calculation section 12 calculates the contact area S0 of the finger 60. Then, the move amount calculation section 13 calculates touch coordinates (S102). Specifically, the area calculation section 12 calculates the contact area S0 by counting the number of cells each in which a change in electrostatic capacity has been detected. On the other hand, the move amount calculation section 13 calculates touch coordinates, for example, by calculating the gravity center of each of a plurality of cells that corresponds to the contact part 62, based on coordinates of each of the cells. Thus, an initial contact area and the touch coordinates at a time point where the finger 60 contacted the screen 61 may be calculated.

Subsequently, the determination section 15 determines whether or not the finger 60 has been released after a predetermined of time has elapsed (S103). In S103, if the reception section 11 has not received coordinate information from the control section 40, or if the reception section 11 has received information indicating that the finger 60 has been released from the touch sensor section 30, the reception section 11 determines that the finger 60 has been released.

If it is determined that the finger 60 has been released (YES in S103), it is determined that an operation of a user is terminated, and a series of processes is terminated. On the other hand, if it is determined that the finger 60 has not been released (NO in S103), it is determined that a contact of the finger 60 to the screen 61 is maintained. Then, the area calculation section 12 calculates a contact area S and the touch coordinates again (S104). A method for calculating the contact area S is similar to a method for calculating the contact area S0.

Subsequently, the threshold determination section 14 calculates a candidate A for a threshold of a move distance of the touch coordinates, which provides an indication of whether or not move control of the screen 61 is to be performed, based on a change amount S−S0 of the contact area, and updates the threshold to the value of the candidate A (S105). The candidate A for the threshold of the move distance may be calculated by adding a product of the change amount S−S0 of the contact area and a coefficient a to the initial value A0, for example, as indicated by Expression 1 below. The initial value A0 is, for example, about 1 mm to 2 mm.

$$A = a(S-S0) + A0 \qquad \text{Expression 1}$$

Subsequently, the determination section 15 determines whether or not the move distance of the finger 60 is larger than the threshold of the move distance (S106). Specifically, the determination section 15 estimates the move distance of the finger 60 by calculating a distance between a position indicated by the touch coordinates calculated in S104 and a position indicated by the touch coordinates calculated in S105. Then, the determination section 15 determines whether or not the move distance of the finger 60, which has been estimated, is larger than the value of the candidate A, which has been set as the threshold.

If it is determined that the move distance of the finger 60 is equal to or smaller than the threshold (NO in S106), it is determined that a tap operation is being performed or that a scroll operation is not completed. Then, the process proceeds to S103, and processing of S103 and subsequent processing are executed again. That is, while the contact of the finger 60 to the screen 61 is maintained, processing from S103 to S105 is repeatedly executed. In accordance with this method, the value of the threshold may be caused to dynamically increase and reduce in accordance with the change amount of the contact area.

On the other hand, if it is determined that the move distance of the finger 60 is larger than the threshold (YES in S106), it is determined that the finger 60 has been moved for a scroll operation. Then, the screen control section 16 executes move control of the screen 61 in accordance with the move direction of the touch coordinates (S107).

Subsequently, the threshold determination section 14 initializes the threshold, and updates the threshold to the initial value A0 (S108). When processing of S108 is completed, a series of processes is terminated. As described above, processing of initializing the threshold is executed at the end of the process flow, and thus, when the process flow is executed again, a time from a time when the finger 60 touches the screen 61 to a time when the candidate A for the threshold is calculated may be reduced. As a result, move control of the screen 61 may be expedited.

In the manner described above, when an operation using the finger 60 is performed, control by the electronic device 100 is executed.

FIGS. 6A, 6B, 6C, and 6D are views and charts illustrating an example of move control of an image according to the first embodiment.

Figure 6A:
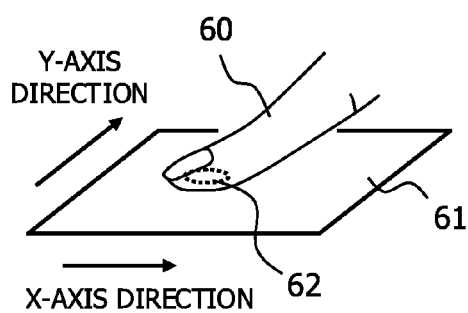
FIGS. 6A, 6B, 6C, and 6D are views and charts illustrating an example of move control of an image according to the first embodiment.

FIG. 6A is a view illustrating a state in which a screen is pressed by force and an operation that are equal to those in the example of FIG. 1C. It is assumed that, in an initial stage in which the finger 60 contacts the screen 61, the screen 61 is pressed by force and an operation that are equal to those in the example of FIG. 1A. When the screen 61 is pressed by force and an operation that are equal to those in the example of FIG. 1C, as illustrated in FIG. 6A, a contact area that is equal to that in the example of FIG. 1C is achieved.

Figure 6B:
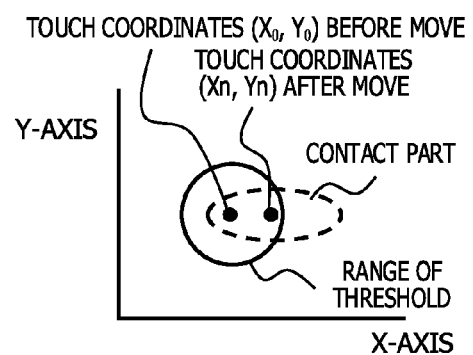

FIG. 6B is a chart illustrating the relationship between a contact part and touch coordinates in the state illustrated in FIG. 6A. When control according to the first embodiment is executed, the threshold is updated in accordance with the contact area. For example, it is understood that, in the example of FIG. 6B, the contact area has been increased to be larger than that in the initial stage, and therefore, the threshold is set to be a larger value than that in the initial stage. Therefore, although the values of the touch coordinates change from $(X_0, Y_0)$ to $(X_n, Y_n)$, the touch coordinates $(X_n, Y_n)$ after the change are in the range of the threshold, so that move control of an image is not executed.

Figure 6C:
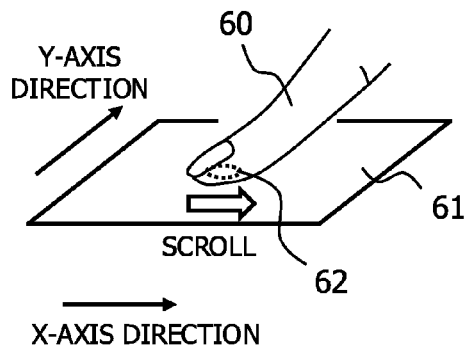

FIG. 6C is a view illustrating a state in which a scroll operation that is equal to that in the example of FIG. 2E is performed. It is assumed that, in an initial stage in which the finger 60 contacts the screen 61, the screen 61 is pressed by force and an operation that are equal to those in the example of FIG. 2A. When the screen 61 is pressed by force and an operation that are equal to those in the example of FIG. 2E, as illustrated in FIG. 6C, a contact area that is equal to that in the example of FIG. 2E is achieved.

Figure 6D:
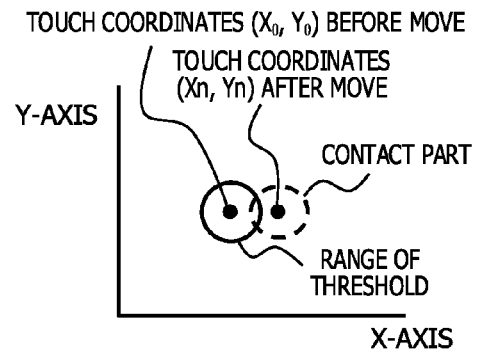

FIG. 6D is a chart illustrating the relationship between a contact part and touch coordinates in the state illustrated in FIG. 6C. When control according to the first embodiment is executed, the threshold is updated in accordance with the contact area. In the example of FIG. 6D, as compared to the initial stage, a large change in contact area is not observed, and therefore, the threshold is set to a value that is approximately equal to that in the initial stage. Therefore, when the screen 61 is scrolled by a similar distance to that in the operation illustrated in FIG. 2E, the touch coordinates $(X_n, Y_n)$ after the move are out of the range of the threshold, and move control of an image in accordance with the direction of the scroll may be performed.

According to the first embodiment, the threshold of the move distance of the touch coordinates is caused to change in accordance with the change amount of the contact area when a finger contacts a screen of a touch panel. In accordance with this method, even when the contact area increases and the touch coordinates move during a tap operation, the threshold of the move distance greatly changes in accordance with an increase amount of the contact area. When the threshold is large, move control of the image is easily inhibited, and therefore, the inconvenience in which the image moves without the user's intention and thus, for example, an icon is not correctly selected, and like inconvenience are not caused.

Furthermore, according to the first embodiment, the threshold of the move distance is caused to change in accordance with a change amount of the contact area also when a scroll operation is performed. In accordance with the above-described method, there is a high probability that, when a scroll operation is performed, a value smaller than a value that may be set, when the screen is strongly pressed by a finger, in accordance with the contact area of a part of the screen which is touched by the finger, is set as the threshold, and therefore, the following property of a move of an image relative to a move of the finger may be kept excellent.

Second Embodiment

Next, a second embodiment will be described. In the first embodiment, since the threshold of the move distance of a finger is caused to increase and reduce in accordance with the direction in which the contact area increases and reduces, when the contact area increases, the threshold increases, and when the contact area reduces, the threshold reduces. In contrast, the second embodiment is characterized in that, if the value of a candidate for the threshold, which has been calculated, is equal to or smaller than a predetermined value, the threshold is not updated and maintained. An electronic device that realizes the second embodiment may employ the configurations of the electronic device illustrated in FIG. 3 and FIG. 4, and therefore, the description thereof will be omitted.

Figure 7:
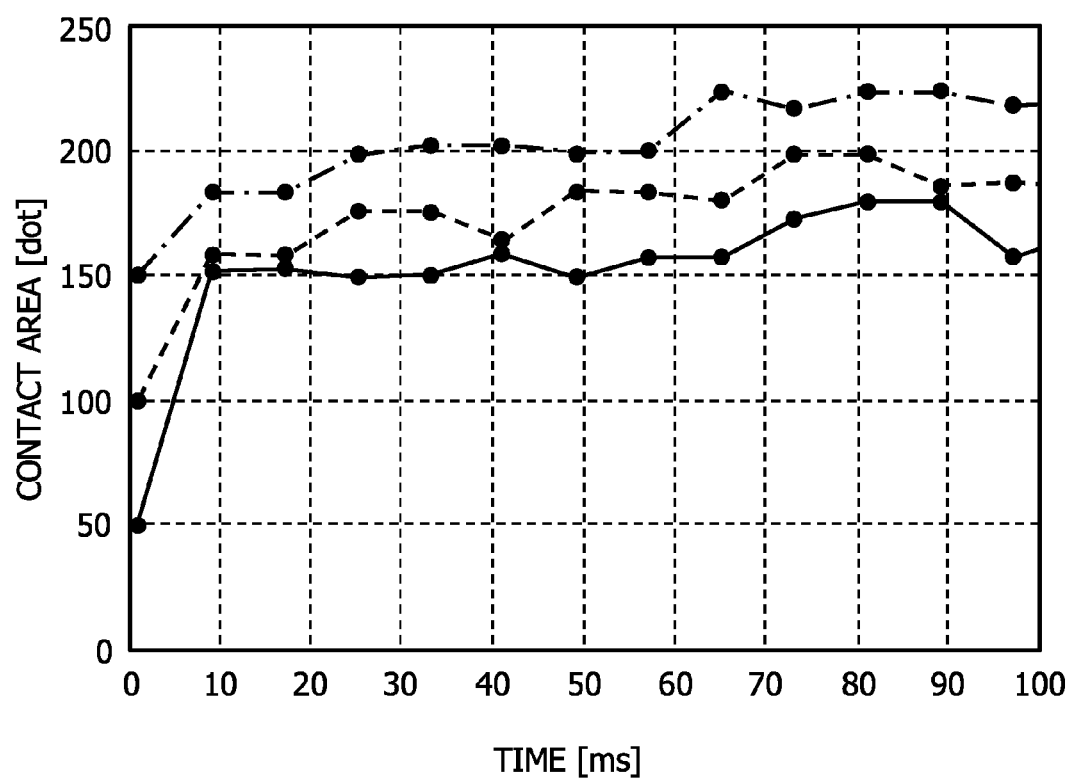
FIG. 7 is a graph illustrating an example of change in contact area when a tap operation is performed.

FIG. 7 is a graph illustrating an example of change in contact area when a tap operation is performed. FIG. 7 illustrates change in contact area when a tap operation is performed three times and, in FIG. 7, three measurement results are indicated by lines of different types. As illustrated in FIG. 7, after the contact area abruptly increases from an initial value, the state of the contact area changes to a steady state in which the change amount is small. However, even in a steady state, the contact area changes (increases and reduces), and a steady value is not a certain value. As described above, the contact area when the finger contacts the screen is unstable, and therefore, there is a probability that a move of the screen without the user's intention is caused due to increase and reduction in contact area, that is, noise.

Figure 8A:
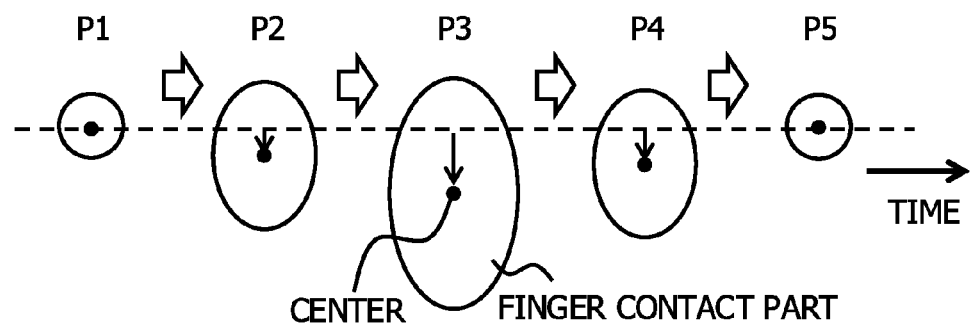
FIGS. 8A and 8B are charts illustrating an example of change with time in contact area and threshold of move distance of a finger according to a second embodiment.
Figure 8B:
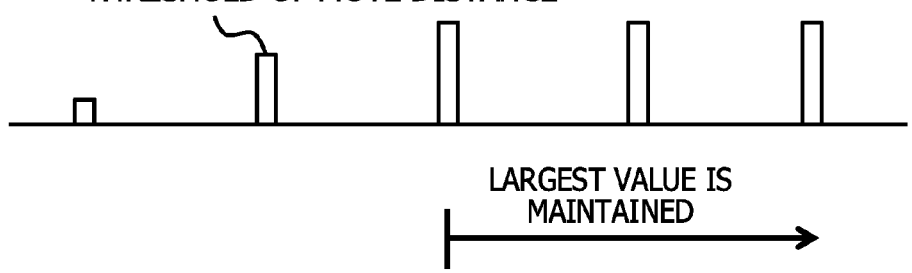

FIGS. 8A and 8B are charts illustrating an example of change with time in contact area and threshold of the move distance of a finger according to the second embodiment. In each of FIG. 8A and FIG. 8B, the abscissa axis is a time axis, and a time proceeds rightward. A dot in each circle in FIG. 8A indicates the position of the touch coordinates, and a dashed line indicates a reference line indicating the initial position of the touch coordinates. The ordinate axis in FIG. 8B indicates the magnitude of the threshold of the move distance, and as the length of a bar increases, the threshold increases.

As illustrated in FIG. 8A, the touch position changes with time in the order of P1, P2, P3, P4, and P5. The contact area gradually increases from a contact part that corresponds to the touch position P1, is the largest in a contact part that corresponds to the touch position P3, and thereafter, gradually reduces up to a contact part that corresponds to the touch position P5.

On the other hand, as illustrated in FIG. 8B, the threshold of the move distance increases in accordance with increase in contact area up to the contact part that corresponds to the touch position P3. However, it is understood that, although the contact area reduces thereafter, the threshold set at the touch position P3 is not updated and is maintained. A control method according to the second embodiment will be described below.

FIG. 9 is a flow chart illustrating an example of a control method performed by an electronic device according to the second embodiment. Processing from S101 to S104 is similar to processing performed in the first embodiment, and therefore, the description thereof will be omitted.

After S104, the threshold determination section 14 calculates the candidate value A for the threshold of the move distance, based on the change amount of the contact area (S105a).

Subsequently, the determination section 15 determines whether or not the candidate A for the threshold of the move distance, which has been calculated in S105a, is larger than the threshold that has been set (S105b). If it is determined that the candidate A for the threshold is larger than the threshold that has been set (YES in S105b), the threshold determination section 14 updates the threshold to the value of the candidate A (S105c). After the processing of S105c, the process proceeds to S106. On the other hand, if it is determined that the candidate A for the threshold is equal to or smaller than the threshold that has been set (NO in S105b), the process proceeds to S106 without executing the processing of S105c. That is, in processing of S105b and processing S105c, if the candidate A for the threshold, which has been calculated in S105a, exceeds the threshold, the threshold is updated, if not, the threshold is not updated, and the largest value of the candidate for the threshold is used as the threshold based on which whether or not move control is to be executed is determined. Processing of S106 and subsequent processing are similar to those in the first embodiment, and therefore, the description thereof will be omitted.

In the manner described above, control by an electronic device according to the second embodiment is executed.

According to the second embodiment, if it is determined that a candidate for a threshold, which has been calculated, is larger than the threshold that has been set, the threshold that has been set is updated to the candidate for the threshold, which has been calculated. On the other hand, if it is not determined that the candidate for the threshold, which has been calculated, is larger than the threshold that has been set, move control of the image is executed, based on the threshold that has been set. In accordance with the above-described method, even when the contact area suddenly reduces, the threshold is not changed and held, and therefore, the threshold reduces due to reduction in contact area, so that a move of the image without the user's intention is not caused.

Figure 10:
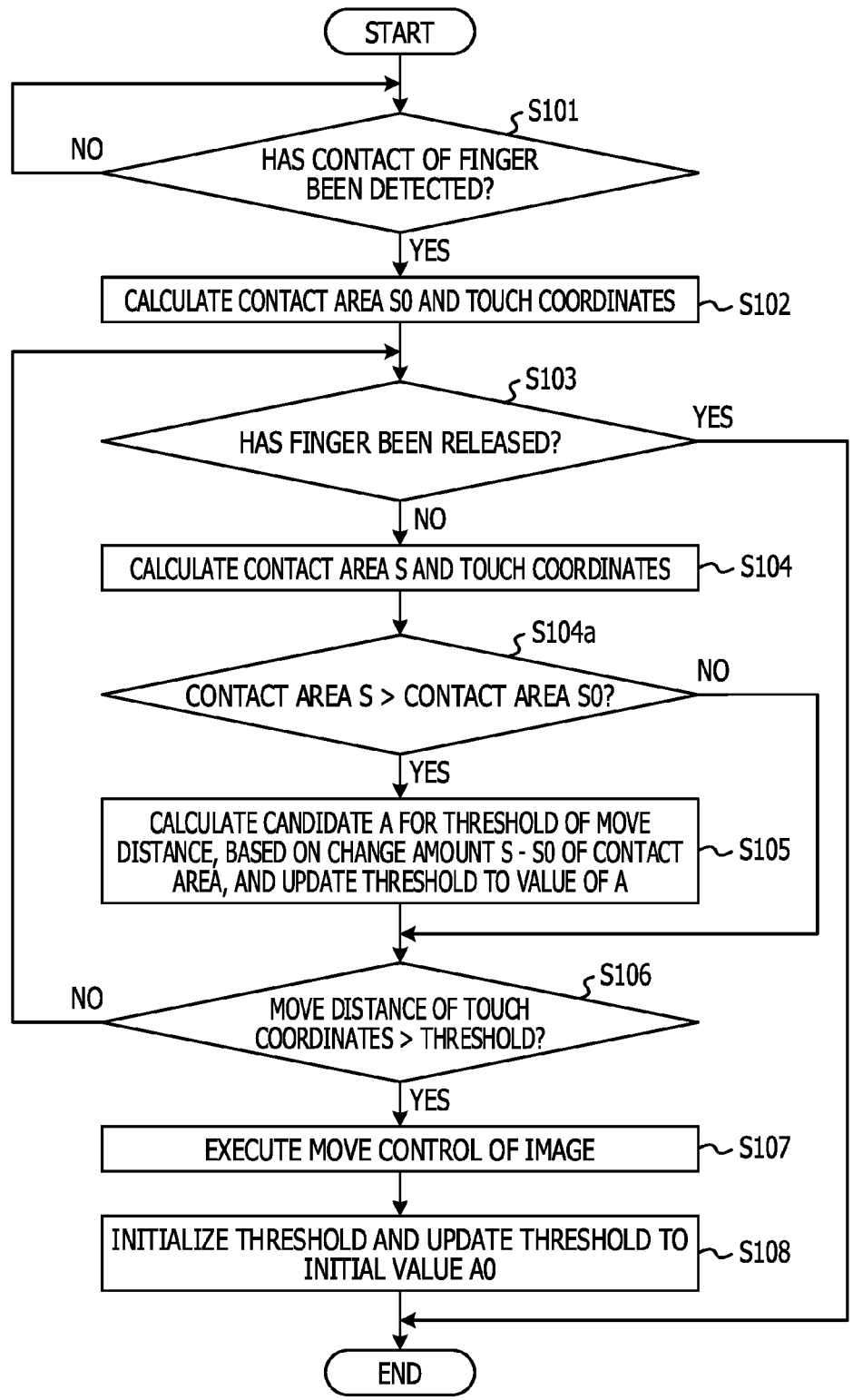
FIG. 10 is a flow chart illustrating an example of a control method performed by an electronic device according to a modified example of the second embodiment.

Next, a modified example of the second embodiment will be described. FIG. 10 is a flow chart illustrating an example of a control method performed by an electronic device according to a modified example of the second embodiment. Processing from S101 to S104 is similar to processing performed in the first embodiment, and therefore, the description thereof will be omitted.

After the processing of S104, the determination section 15 determines whether or not the contact area S calculated in S104 is larger than the contact area S0 calculated previously in S102 (S104a). If it is determined that the contact area S is equal to or smaller than the contact area S0 (NO in S104a), the process proceeds to S106. On the other hand, if it is determined that the contact area S is larger than the contact area S0 (YES in S104a), the threshold determination section 14 calculates the candidate A for the threshold, and executes processing of S105 in which the threshold is updated to the candidate A. After the processing of S105, the process proceeds to S106. Processing of S106 and subsequent processing are similar to processing illustrated in FIG. 5 or processing illustrated in FIG. 9, and therefore, the description thereof will be omitted.

If the contact area S is larger than the contact area S0, the contact area has increased, and therefore, when the candidate A for the threshold is calculated, a larger value than the threshold that has been set is achieved. Therefore, if it is determined that the contact area S is larger than the contact area S0, the candidate A for the threshold is calculated, and the processing of S105 in which the threshold is updated to the candidate A is executed.

On the other hand, if the contact area S is equal to or smaller than the contact area S0, the contact area has not increased, and therefore, even when the candidate A for the threshold is calculated, the calculated candidate A is not larger than the threshold that has been set. Therefore, if it is determined that the contact area S is equal to or smaller than the contact area S0, calculation of the candidate A for the threshold is not performed, and move control of an image is executed using the threshold that has been already set.

As described above, in this modified example, whether or not the contact area has increased in a state in which a contact of a finger to a screen is maintained is determined. Then, only if it is determined that the contact area has increased, the candidate A for the threshold is calculated, and the threshold is updated to the candidate A for the threshold. In accordance with this method, if it is determined that the contact area S is equal to or smaller than the contact area S0, calculation of the candidate A for the threshold may be omitted, so that move control of an image may be expedited and a processing load may be reduced.

Third Embodiment

Next, a third embodiment will be described. In the first and second embodiments, when move control of an image is executed, based on the latest threshold, a series of processes is terminated. In contrast, the third embodiment is characterized in that, after move control of an image is executed, if a predetermined condition for the behavior of a finger is satisfied, move control of the image is executed again.

FIGS. 11A, 11B, 11C, and 11D are views and charts illustrating an example in which touch coordinates move after move control of an image is executed.

Figure 11A:
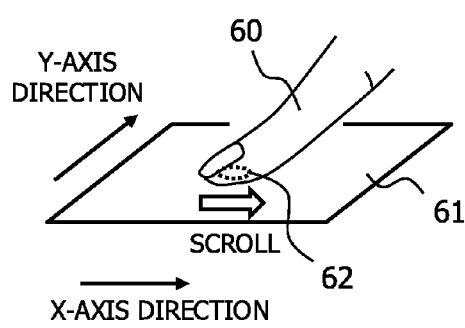
FIGS. 11A, 11B, 11C, and 11D are views and charts illustrating an example in which touch coordinates move after move control of an image is executed.
Figure 11B:
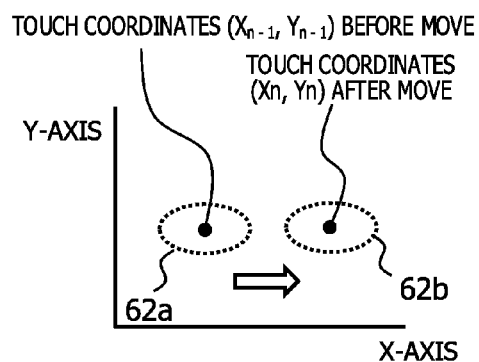

FIG. 11A is a view illustrating a state in which a scroll operation is performed by a finger. FIG. 11B is a chart illustrating the relationship between a contact part and touch coordinates in the state illustrated in FIG. 11A. The "X-axis" indicates the X-axis on the screen 61, and the "Y-axis" indicates the Y-axis on the screen 61. As illustrated in FIG.

11B, when a scroll operation is performed by the finger 60, the contact area moves from a contact part 62a to a contact part 62b. Accordingly, the touch coordinates also move, and the values of the touch coordinates change from $(X_{n-1}, Y_{n-1})$ to $(X_n, Y_n)$.

Figure 11C:
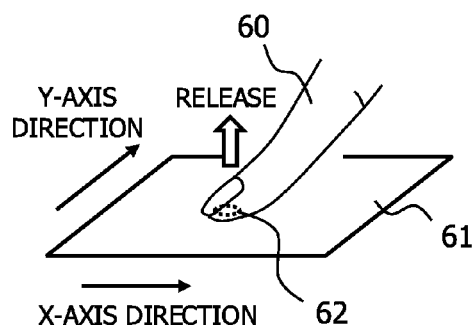
Figure 11D:
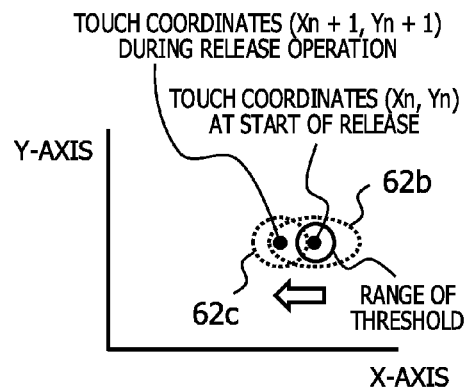

FIG. 11C is a view illustrating a state in which a scroll operation is performed by a finger. FIG. 11D is a chart illustrating the relationship between a contact part and touch coordinates in the state illustrated in FIG. 11C. In FIG. 11D, a part surrounded by the solid circle indicates a range of a threshold of the move distance of the touch coordinates in which move control of an image is not performed, and the radius of the circle indicates the threshold.

When the user terminates the scroll operation, the user starts releasing the finger 60 from the screen 61. Then, as illustrated in FIG. 11D, in accordance with a movement of the finger 60, the contact part moves from the contact part 62b to a contact part 62c. Accordingly, the touch coordinates move, and the values of the touch coordinates change from $(X_n, Y_n)$ to $(X_{n+1}, Y_{n+1})$. The touch coordinates $(X_{n+1}, Y_{n+1})$ after the change are out of the range of the threshold, which is surrounded by the solid circle, and therefore, move control of the image is performed. As described above, there are cases where, when the user releases the finger 60 from the screen 61, the image moves without the user's intention.

Figure 12:
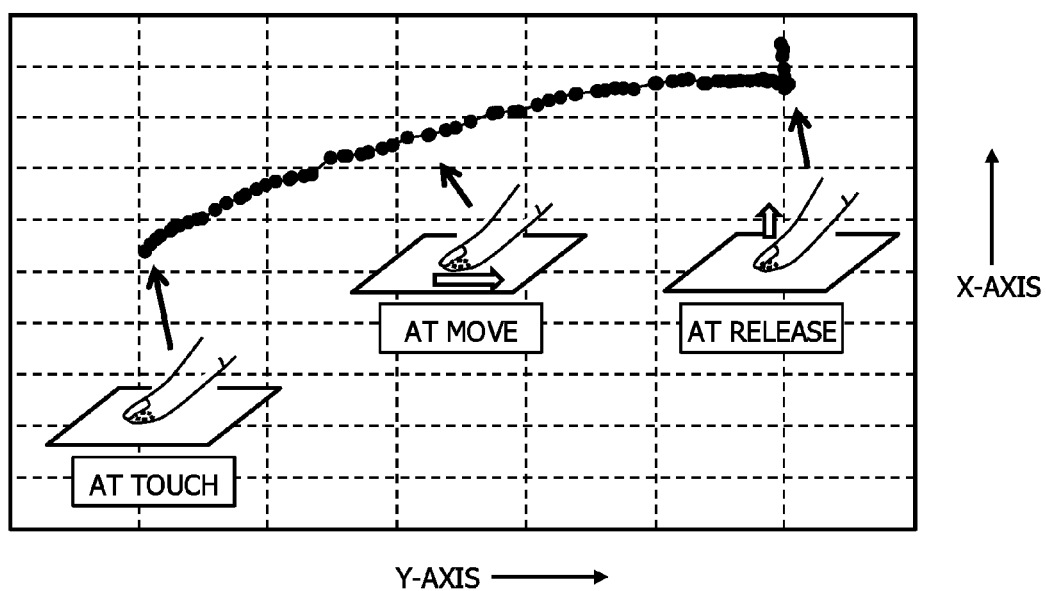
FIG. 12 is a graph illustrating an example of change in touch coordinates during a scroll operation.

FIG. 12 is a graph illustrating an example of change in touch coordinates during a scroll operation. The abscissa axis indicates the Y-axis on the screen 61, and the ordinate axis indicates the X-axis on the screen 61. In the example of FIG. 12, the origin is set at the lower left of the screen 61. FIG. 12 illustrates an example in which the user moves the finger 60 in a direction from the upper left to the lower right, that is, a direction in which the value of a coordinate on the Y-axis reduces and the value of a coordinate on the X-axis increases, and then, releases the finger 60. As illustrated in FIG. 12, while the user moves the finger 60 in a state in which the finger 60 is kept contacting the screen 61, the touch coordinates move in a direction in which the value of the coordinate on the Y-axis reduces and the value of the coordinate on the X-axis increases. However, it is understood that, after the timing at which the user starts releasing the finger 60, the touch coordinates move in a direction that is different from that when a scroll operation is performed, that is, a direction in which the value of the coordinate on the Y-axis hardly changes and the value of the coordinate on the X-axis increases. Then, this change in the touch coordinates is a cause for a move of the image without the user's intention.

Figure 13:
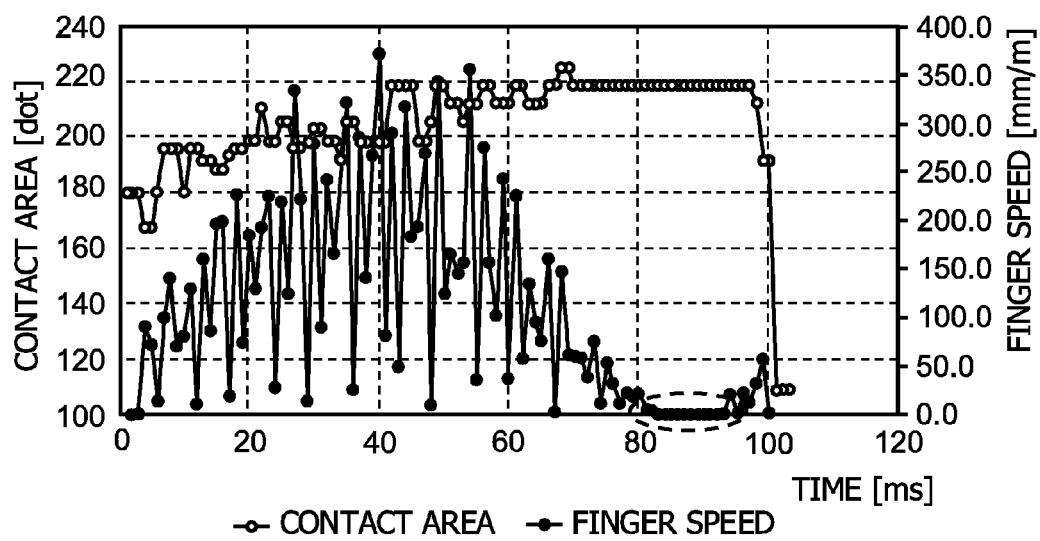
FIG. 13 is a graph illustrating an example of change in control area and change in finger speed during a scroll operation.

FIG. 13 is a graph illustrating an example of change in control area and change in finger speed during a scroll operation. The finger speed is the speed of the finger 60 during a scroll operation. The abscissa axis indicates time, and the ordinate axis indicates the contact area or the finger speed. White circles in FIG. 13 indicate information of the contact area, and the value of the contact area may be known with reference to the scale on the ordinate axis at the left side of the FIG. 13. Black circles in FIG. 13 indicate information of the finger speed, and the value of the finger speed may be known with reference to the scale of the ordinate axis on the right side of the FIG. 13.

As illustrated in FIG. 13, after the contact area irregularly increases and reduces from the beginning of a contact, around 70 ms and after, the contact area is a certain value. Then, around after 90 ms, the finger 60 is released, and thus, the contact area abruptly reduces. On the other hand, the finger speed increases and reduces at an amplitude larger than that of the contact area, reaches a peak around after 40 ms, thereafter reduces, and, as indicated by a part surrounded by the dashed line, is zero from around after 80 ms to a timing at which the user starts releasing the finger 60. This indicates that, after a scroll operation is performed, the finger 60 is stopped on the screen, and then, a release operation is performed. Therefore, in the third embodiment, at a timing at which the move of the finger 60 is close to a state in which the finger 60 is stopped on the screen, move control of the screen 61 is executed again.

Figure 14:
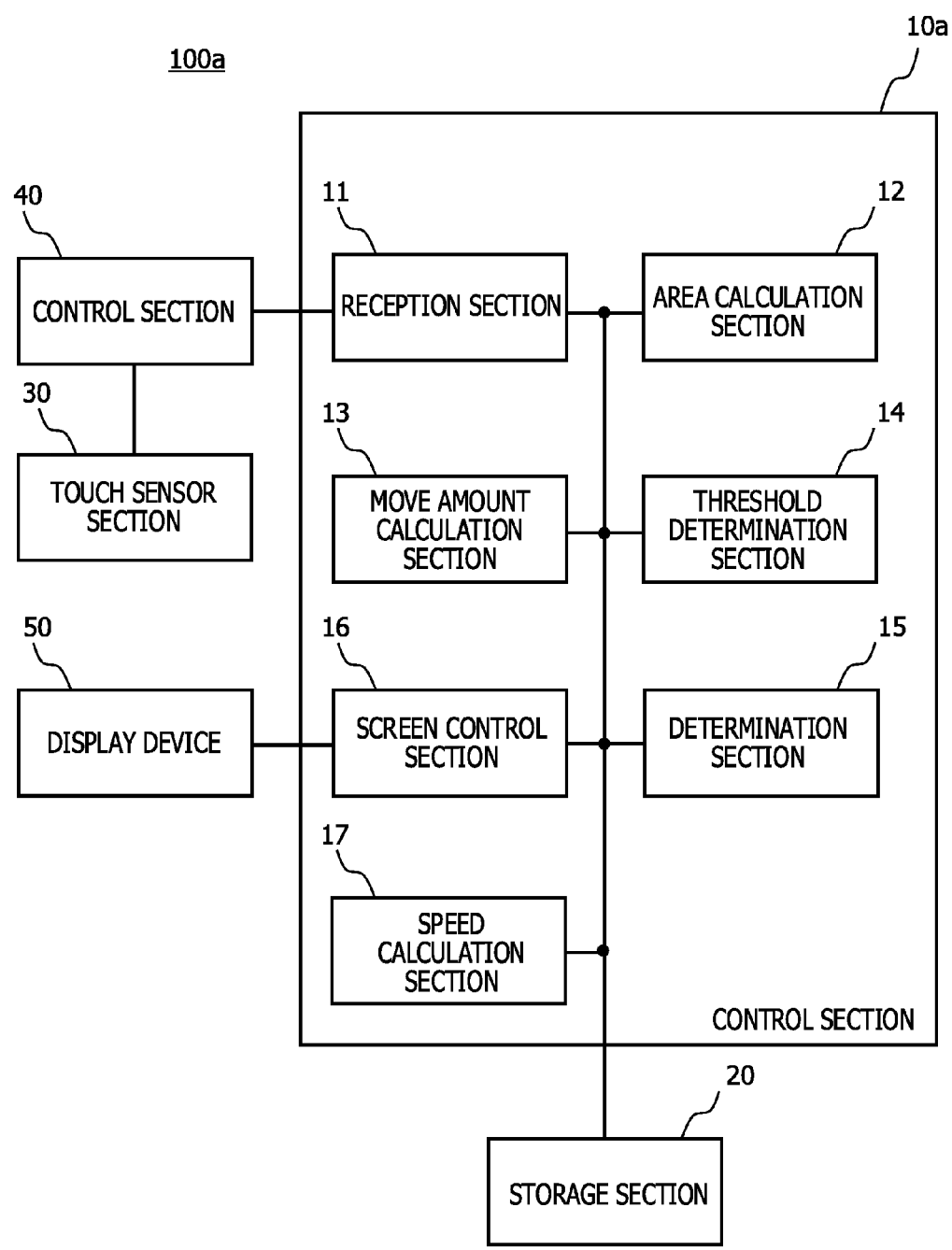
FIG. 14 is a block diagram illustrating an example of a function block of an electronic device according to a third embodiment.

FIG. 14 is a block diagram illustrating an example of a function block of an electronic device according to the third embodiment. Each common function block shared with the electronic devices of the first and second embodiments is denoted by the same reference character as that in the first and second embodiments, and the description thereof will be omitted. As illustrated in FIG. 14, a control section 10a includes, in addition to the function block group of the control section 10 of each of the first and second embodiment, a speed calculation section 17 that calculates the move speed of the finger 60. Each coordinate information received by the reception section 11 from the control section 40 is associated with information of time. Thus, the speed calculation section 17 may obtain the move speed of the finger 60 by dividing a distance between two positions indicated by coordinates by a difference between times that correspond to the two positions indicated by coordinates. As a hardware configuration of an electronic device that realizes the third embodiment, the configuration illustrated in FIG. 4 may be employed, and therefore, the description thereof will be omitted.

Figure 15:
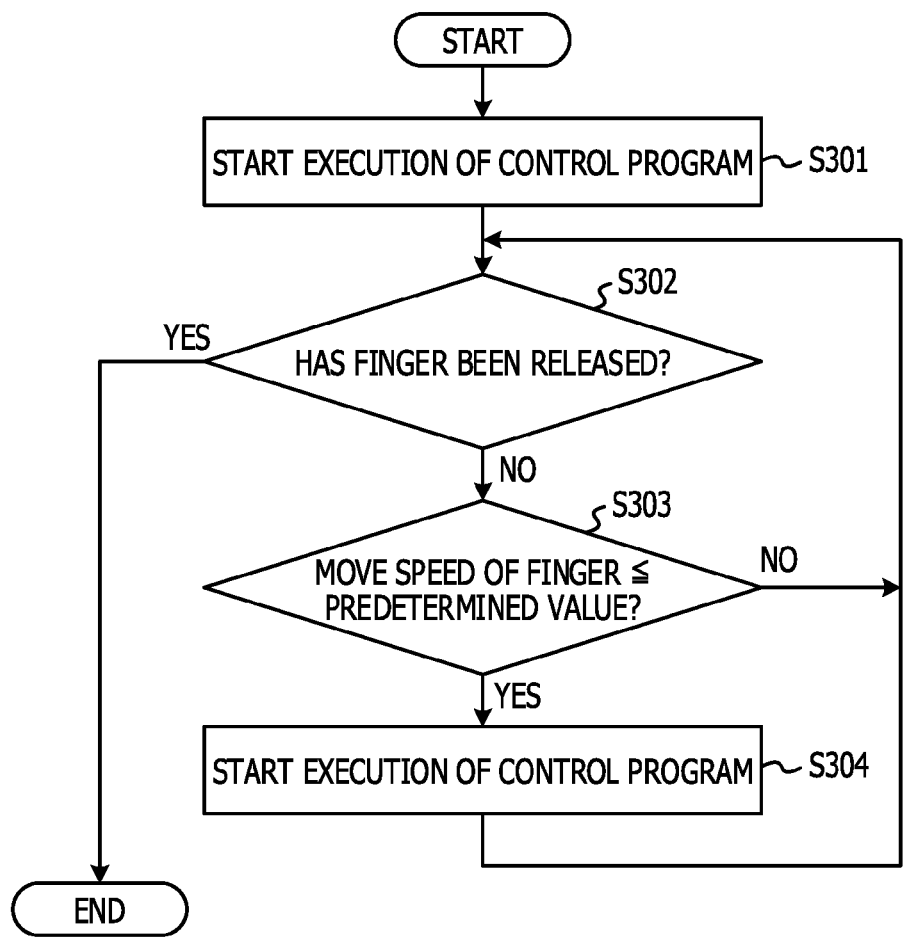
FIG. 15 is a flow chart illustrating an example of a control method performed by an electronic device according to the third embodiment.

FIG. 15 is a flow chart illustrating an example of a control method performed by an electronic device according to the third embodiment.

First, an electronic device 100a starts executing a control program used for performing move control of an image, which is illustrated in FIG. 5 of the first embodiment or FIG. 9 and FIG. 10 of the second embodiment, that is, move control of an image performed while dynamically changing the threshold of the move distance (S301).

Then, after a series of processes, for example, from S101 to S108 of FIG. 5, based on the control program, is terminated, the determination section 15 determines whether or not the finger 60 has been released (S302).

If it is determined that the finger 60 has not been released (NO in S302), the speed calculation section 17 calculates the move speed of the finger 60.

Thereafter, the determination section 15 determines whether or not the move speed of the finger 60 is equal to or lower than a predetermined value (S303). The predetermined value is, for example, 5 mm/s. If it is determined that the move speed of the finger 60 is not equal to or lower than the predetermined value (NO in S303), the process returns to S302 again, and the processing of S302 and subsequent processing are executed. On the other hand, if it is determined that the move speed of the finger 60 is equal to or lower than the predetermined value (YES in S303), it is determined that the finger 60 is in a state close to a state in which the finger 60 is stopped, and execution of the control program is started again (S304). Thereafter, the process returns to S302 again, and the processing of S302 and subsequent processing are executed.

In S302, if it is determined that the finger 60 has been released (YES in S302), the processing is terminated.

In a manner described above, control by the electronic device 100a according to the third embodiment is executed.

According to the third embodiment, after move control of an image according to the first embodiment or the second embodiment is executed, if a contact of a finger to a screen is maintained and also if it is determined that the finger is in a state close to a state in which the finger is stopped, move control of the image is executed again. In accordance with this method, even when the touch coordinates move without the user's intention when the user releases the finger, the image does not move.

Preferred embodiments of the present disclosure have been described above, but the present disclosure is not limited to specific embodiments, and various modifications and changes may be made. For example, in the flow chart illustrated in FIG. 5, if NO is determined in S106, the process proceeds to S103, but the process may proceed to S101 or S102. For example, if the process proceeds to S102, the processing of S102 and subsequent processing are executed again.

A configuration in which a touch panel is not disposed on a display may be employed. That is, a touch panel may be provided in association with a display so as to be capable of operating an image displayed on the display.

The above-described electronic devices, a computer program that causes a computer to execute an information processing method, and a non-transitory computer-readable storage medium in which the computer program is stored fall in the scope of the present disclosure. The non-transitory computer-readable storage medium herein is, for example, a memory card, such as an SD memory card and the like. The computer program is not limited to a computer program stored in the storage medium, but may be a computer program that is transmitted via a network represented by an electronic communication line, a wireless or wired communication line, and the Internet, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method that is executed by a processor included in an electronic device including a touch panel provided in association with a display device, the control method comprising:
    calculating a contact area that indicates a size of a contact part when the touch panel is touched;
    setting a threshold used for determining whether a touch position on the touch panel has changed, based on the magnitude of the calculated contact area;
    determining that a scroll instruction to the display device has been made when a change in touch position is larger than the threshold; and
    executing move control of an image displayed on a screen of the display device in accordance with the scroll instruction.

2. The control method according to claim 1, wherein the setting includes:
    calculating a candidate for the threshold, based on a change amount of the contact area, each time a change in contact area is detected, and
    setting the threshold, based on a value of the candidate for the threshold.

3. The control method according to claim 2, wherein the setting includes
    updating the threshold that has been set to the candidate for the threshold, when it is determined that the candidate for the threshold is larger than a threshold that has been set.

4. The control method according to claim 2, wherein the executing includes
    executing the move control of the image based on the threshold that has been set, when it is not determined that the candidate for the threshold is larger than a threshold that has been set.

5. The control method according to claim 2, wherein the setting includes:
    calculating a candidate for the threshold to update the threshold that has been set to the candidate for the threshold, when it is determined that the contact area has increased due to the change in contact area, and
    causing calculation of the candidate for the threshold not to be performed, when it is not determined that the contact area has increased.

6. The control method according to claim 5, wherein the executing includes
    executing the move control of the image based on the threshold that has been set, when it is not determined that the contact area has increased.

7. The control method according to claim 1, further comprising:
    executing the move control again, after the move control is executed, when a contact of an object is maintained and when a move speed of the object is equal to or smaller than a predetermined value.

8. An electronic device, comprising:
    a display device;
    a touch panel provided in association with the display device; and
    a processor coupled to the touch panel and configured to:
        calculate a contact area that indicates a size of a contact part when the touch panel is touched, set a threshold used for determining whether a touch position on the touch panel has changed, based on the calculated contact area,
        determine that a scroll instruction to the display device has been made, when a change in touch position is larger than the threshold, and
        execute a scroll of a screen of the display device in accordance with the scroll instruction.

9. The electronic device according to claim 8, wherein the processor is configured to:
    calculate a candidate for the threshold, based on a change amount of the contact area, each time a change in contact area is detected, and
    set the threshold, based on a value of the candidate for the threshold.

10. The electronic device according to claim 9, wherein the processor is configured to
    update the threshold that has been set to the candidate for the threshold, when it is determined that the candidate for the threshold is larger than a threshold that has been set.

11. The electronic device according to claim 9, wherein the processor is configured to
    execute the move control of the image based on the threshold that has been set, when it is not determined that the candidate for the threshold is larger than a threshold that has been set.

12. The electronic device according to claim 9, wherein the processor is configured to:
calculate a candidate for the threshold to update the threshold that has been set to the candidate for the threshold, when it is determined that the contact area has increased due to the change in contact area, and
cause calculation of the candidate for the threshold not to be performed, when it is not determined that the contact area has increased.

13. The electronic device according to claim 12, wherein the processor is configured to
execute the move control of the image based on the threshold that has been set, when it is not determined that the contact area has increased.

14. A non-transitory computer-readable storage medium storing a program that causes a processor included in an electronic device including a touch panel provided in association with a display device to execute a process, the process comprising:
calculating a contact area that indicates a size of a contact part when the touch panel is touched;
setting a threshold used for determining whether or not a touch position on the touch panel has changed, based on the calculated contact area;
determining that a scroll instruction to the display device has been made when a change in touch position is larger than the threshold; and
executing a scroll of a screen of the display device in accordance with the scroll instruction.

15. The electronic device according to claim 8, wherein the processor is configured to execute the scroll again, after the scroll is executed, when a contact of an object is maintained and when a move speed of the object is equal to or smaller than a predetermined value.

16. The storage medium according to claim 14, wherein the process further comprises executing the scroll again, after the scroll is executed, when a contact of an object is maintained and when a move speed of the object is equal to or smaller than a predetermined value.

* * * * *